July 4, 1933.  P. I. HOLLMAN  1,916,572
GAS BURNER
Filed April 12, 1930   2 Sheets-Sheet 1
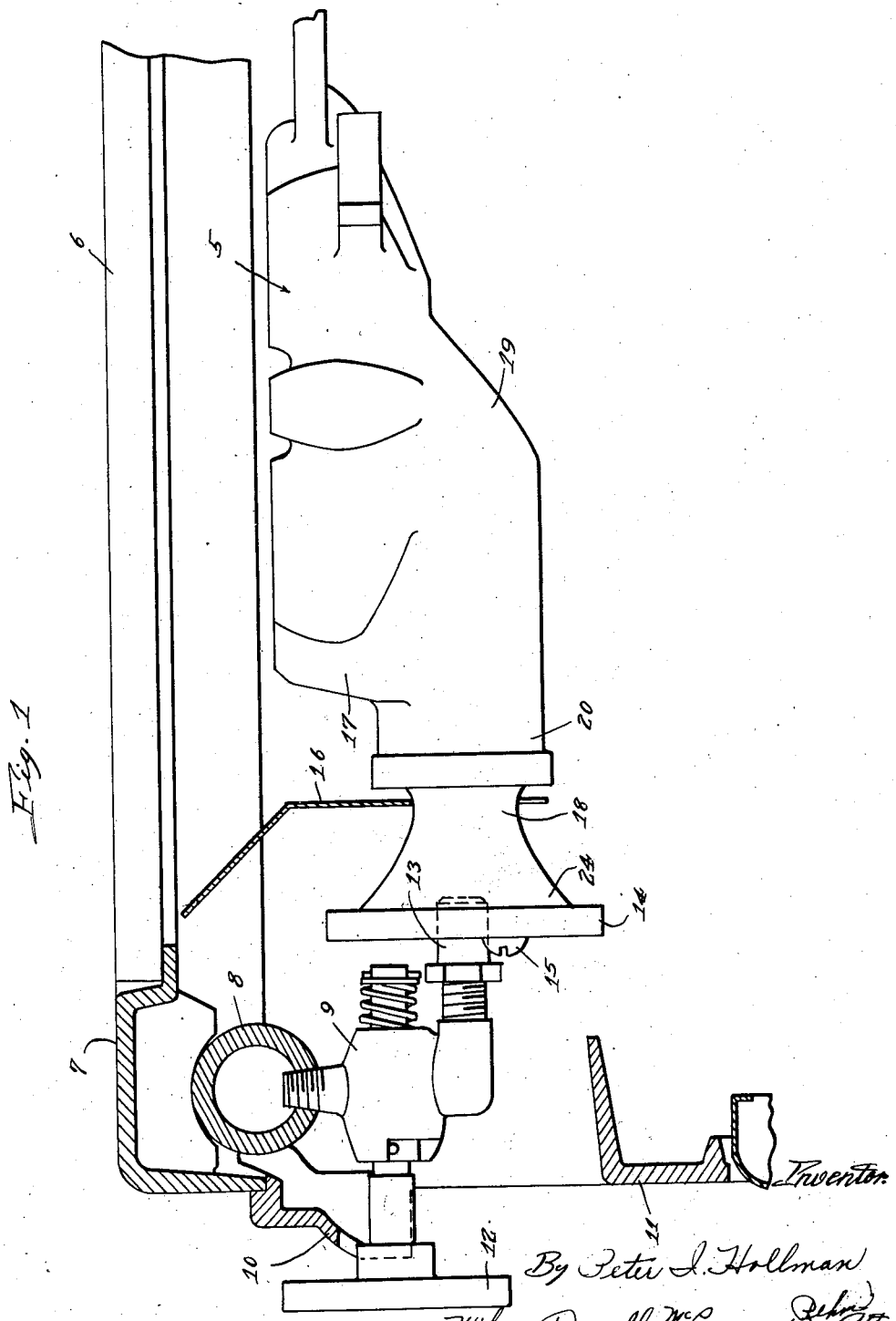

July 4, 1933. P. I. HOLLMAN 1,916,572
GAS BURNER
Filed April 12, 1930 2 Sheets-Sheet 2
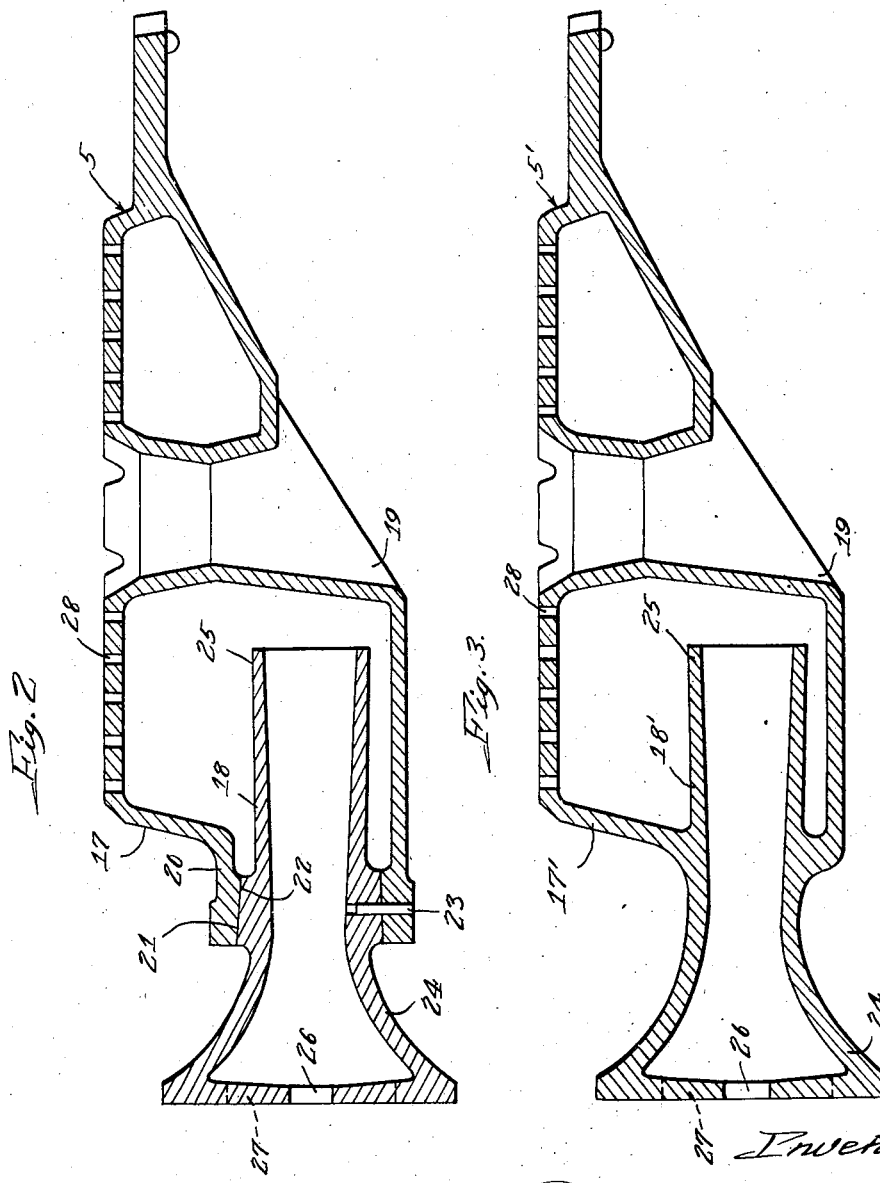

Patented July 4, 1933

1,916,572

UNITED STATES PATENT OFFICE

PETER I. HOLLMAN, OF ROCKFORD, ILLINOIS, ASSIGNOR TO GEO. D. ROPER CORPORATION, OF ROCKFORD, ILLINOIS, A CORPORATION OF ILLINOIS

GAS BURNER

Application filed April 12, 1930. Serial No. 443,646.

This invention relates to gas burners generally, but has more particular reference to cooking top burners for gas ranges.

The change from the exposed to the concealed manifolds brought with it the necessity of redesigning the front burners of the cooking top. The mixing tube of a burner has to be of a predetermined length in order that a good combustible mixture will be produced. With the manifold concealed, there is not sufficient space between the manifold and the burner for a mixing tube of the proper length. It is, therefore, the object of my invention to provide a burner having the mixing tube thereof projecting a portion of its length inside the hollow body of the burner proper, thus permitting the enlarged bell-shaped end of the tube to be brought into close proximity with the burner without interfering with the formation of a good combustible mixture.

It is also an object of my invention to provide for good distribution of the combustible mixture to the burner ports of a star-shaped burner by providing one of the fingers thereof of enlarged form and having the mixing tube projecting therein so that it is spaced from all of the inside walls of the finger for good distribution of gas to the ports at the outer end of the finger, and so that the discharge end of the tube is spaced sufficiently from the top of the burner so as not to favor ports directly above the same.

The invention is illustrated in the accompanying drawings in which—

Figure 1 shows a burner made in accordance with my invention installed in a concealed manifold gas range;

Fig. 2 is a central longitudinal vertical section through the burner shown in Fig. 1; and Fig. 3 is a similar view showing a slightly different construction.

Similar reference numerals are applied to corresponding parts throughout the views.

The burner, indicated generally by the reference numeral 5, is shown disposed beneath the usual grate 6 of the cooking top 7 and arranged to be supplied with gas from the concealed manifold 8 through a cock 9. The latter is shown projecting from the lower side of the manifold behind the apron 10 of the burner box front 11 and provided with a suitable knob 12. A nipple 13, screwed on the discharge end of the cock, discharges the gas into the burner along with primary air delivered through the usual shutter 14, the adjustment screw for which appears at 15. 16 is a shield suitably stamped from sheet metal and interposed between the front burners and the manifold to prevent heating of the cocks when these burners are in use. From this much description it is evident that with the manifold 8 brought in so close to the front burners of the cooking top there is not sufficient space therebetween for mixing tubes such as are provided on the rear burners or such as were provided on the front burners in connection with the exposed manifolds.

The burner 5, provided in accordance with my invention, is made in two sections, namely, a main body section 17 and a mixing tube section 18. The body 17 is suitably cast to the usual star shape with the one finger, which projects toward the manifold 8, enlarged so as to provide a depending boss 19 merging with a neck portion 20. The latter has a tapered opening 21 in which a correspondingly tapered intermediate portion 22 of the mixing tube 18 is arranged to be wedgingly received and suitably pinned, or otherwise secured, as indicated at 23. The mixing tube is venturi-shaped, the portion 22 being approximately at the throat of the venturi between the enlarged bell-shaped inlet end 24 and the discharge end 25. The inlet end 24 has the central opening 26 to receive the nipple 13 and has the usual segmental air openings 27 for cooperation with the air openings in the shutter 14. The mixing tube is made of a predetermined length required for the production of a good combustible mixture. That is to say, the tube is of a predetermined length from the throat of the venturi to the discharge end, it having been found that this length should be approximately three times the throat diameter for the best combustion. The enlargement of the one finger of the burner affords ample space therein for the mixing tube so that it is not restricted in its discharge of gas into the burner, and there is furthermore, space about the tube in said finger for good delivery of gas to the outermost ports of said finger, thus avoiding the likelihood of the inner ports being favored. The fact that the enlargement of the finger is entirely below the plane of the top of the burner and the mixing tube can be set so low, provides for the proper spaced relationship between the discharge end of the mixing tube and the ports 28 of the burner so that there will be good distribution of the combustible mixture to all of said ports and no tendency to favor those ports directly above the discharge end of the mixing tube.

The operation of the burner is believed to be evident from the foregoing description; when the cock 9 is opened the gas delivered through the nipple 13 into the throat of the venturi of the mixing tube causes air to be drawn in to mix with the gas to form a combustible mixture, provided, of course, the shutter 14 has been properly adjusted to admit sufficient air. The mixing tube is long enough for the gas to have an opportunity of becoming thoroughly mixed with the air before it is discharged into the burner proper.

In Fig. 3 the body 17' of the burner 5' is shown as cast integral with the mixing tube 18'. The same results are naturally obtained with this construction as with the two-piece construction.

I claim:

1. A star-shaped front cooking top burner for gas stoves comprising a hollow body member providing therein an annular mixing chamber, said body member being formed to provide hollow radiating fingers in communication with the annular mixing chamber, all of said fingers having suitable ports in the top walls thereof, one of said fingers being enlarged to provide a gas inlet, and a mixing tube in said finger, said tube being elongated and having one end enlarged and constituting its inlet end, said tube being disposed with its enlarged inlet end extending from the outer end of the finger, the outlet end of said mixing tube in said finger being in spaced relation to the inside walls of said finger substantially the full length thereof for good distribution of gas therefrom to all of the ports in the finger, said mixing tube being in direct communication at its outlet end with the aforesaid annular mixing chamber.

2. A star-shaped front cooking top burner for gas stoves comprising a hollow body member providing therein an annular mixing chamber, said body member being formed to provide hollow radiating fingers in communication with the annular mixing chamber, all of said fingers having suitable ports in the top walls thereof, the top walls of all of the fingers being in a common plane, and one of the fingers being enlarged entirely below said plane to provide a depending hollow boss to serve as a gas inlet for the burner, and a mixing tube in said finger, said tube being elongated and having one end enlarged and constituting its inlet end, said tube being disposed with its enlarged inlet end extending from said finger, the outlet end of said tube in said finger being in direct communication with the annular mixing chamber, and said outlet end being spaced from the inside walls of the finger substantially the full length thereof, and disposed in the lowermost portion of said finger with its longitudinal axis substantially parallel with the top wall of the burner and at a predetermined distance below the same, whereby to secure uniform distribution of gas to all of the ports in the top wall of said finger and to the ports in the top walls of the other fingers communicating with the annular mixing chamber.

3. A gas burner adapted for use in an appliance requiring a short length burner, comprising a mixing tube having an enlarged inlet end, and a burner body having hollow ported fingers radiating from a hollow ring, one of said fingers being enlarged in cross-section sufficiently to contain the mixing tube in annularly spaced relation to the inside of the finger, said tube being disposed in said finger in annularly spaced relation to the inside thereof and said finger being sufficiently elogated to accommodate the mixing tube with its enlarged inlet end left projecting, said mixing tube being disposed in said fingers so that only the enlarged end of said tube projects from the outer end of said finger, the inner end of said tube being in communication with the inside of said hollow ring, whereby to supply gas to the ports of all of said fingers radiating from said hollow ring.

4. A gas burner adapted for use in an appliance requiring a short length burner, comprising a mixing tube having an enlarged inlet end, and a burner body having hollow ported fingers radiating from a hollow ring, one of said fingers being enlarged in cross-section sufficiently to contain the mixing tube in annularly spaced relation to the inside of the finger, said tube being disposed in said finger in annular spaced relation to the inside thereof and said finger being sufficiently elongated to accommodate the mixing tube with its enlarged inlet end left projecting, said finger having an opening provided in the outer end thereof and said mixing tube being entered through said opening and disposed in said finger so that only the enlarged end of said tube projects from the outer end of said finger, the inner end of said tube being in communication with the inside of said hollow ring, whereby to supply gas to the ports of all of said fingers radiating from said hollow ring, said tube making a gas-tight connection with the burner body in said opening.

In witness of the foregoing I affix my signature.

PETER I. HOLLMAN.